United States Patent [19]

Rabinovitz et al.

[11] Patent Number: 5,335,741
[45] Date of Patent: Aug. 9, 1994

[54] EXTERNALLY MOUNTED TRACK APPARATUS FOR A WHEEL CHAIR

[75] Inventors: Talmon Rabinovitz, Kfar Saba; Zvi Gilad-Smolinsky, Haifa; Mordechay Rutenberg, Ra'anana, both of Israel

[73] Assignee: Israel Aircraft Industries Ltd., Lod, Israel

[21] Appl. No.: 887,178

[22] Filed: May 21, 1992

[30] Foreign Application Priority Data

May 22, 1991 [IL] Israel .................. 098207

[51] Int. Cl.$^5$ ............................. B62D 55/04
[52] U.S. Cl. .................. 180/8.2; 180/907; 280/5.22
[58] Field of Search .......... 180/8.2, 9.22, 907; 280/5.22, DIG. 10

[56] References Cited

U.S. PATENT DOCUMENTS

| | | | |
|---|---|---|---|
| 3,111,331 | 11/1963 | Locke | 280/5.22 |
| 3,127,188 | 3/1964 | Greub | 280/5.22 |
| 3,146,841 | 9/1964 | Locke | 180/8.2 |
| 3,191,953 | 6/1965 | Aysta | 280/5.22 |
| 3,198,534 | 8/1965 | Porter | 280/5.22 |
| 3,231,290 | 1/1966 | Weyer | 280/5.22 |
| 3,269,478 | 8/1966 | Joslyn | 180/8.2 |
| 3,438,641 | 4/1969 | Bradley | 280/5.28 |
| 3,592,282 | 7/1971 | Soileau | 180/8.2 |
| 3,602,522 | 8/1971 | Zamotin | 280/5.22 |
| 3,869,011 | 3/1975 | Jensen | 180/9.24 |
| 4,401,178 | 8/1980 | Studer | 180/8.2 |
| 4,411,330 | 10/1983 | Blokland | 180/8.2 |
| 4,432,426 | 2/1984 | Misawa | 180/8.2 |
| 4,566,550 | 1/1986 | Misawa | 180/8.2 |
| 4,566,706 | 1/1986 | Bihler | 280/5.22 |
| 4,569,409 | 2/1987 | Kluth | 180/8.2 |
| 4,671,369 | 6/1987 | Tiffin | 180/8.1 |
| 4,674,584 | 6/1987 | Watkins | 180/907 |
| 4,771,839 | 9/1988 | Misawa | 180/8.2 |
| 4,898,256 | 2/1990 | Lehner | 180/8.2 |
| 4,915,184 | 4/1990 | Watkins | 180/907 |
| 5,158,309 | 10/1992 | Quigg | 180/907 |

FOREIGN PATENT DOCUMENTS

| | | |
|---|---|---|
| 1150333 | 7/1983 | Canada . |
| 0213394 | 3/1987 | European Pat. Off. . |
| 0299839 | 1/1989 | European Pat. Off. . |
| 3150193 | 6/1983 | Fed. Rep. of Germany . |
| 3617518 | 11/1987 | Fed. Rep. of Germany . |
| 3827607 | 3/1989 | Fed. Rep. of Germany . |
| 2615100 | 11/1988 | France . |
| 693983 | 7/1953 | United Kingdom . |
| 1046444 | 10/1966 | United Kingdom ...... 280/5.22 |

Primary Examiner—Mitchell J. Hill
Attorney, Agent, or Firm—Ladas & Parry

[57] ABSTRACT

Apparatus for assisting travel across a travel surface not suitable for traverse by a wheelchair having a chassis, a seat mounted onto the chassis, a pair of manually rotatable drive wheels mounted about a rotation axis extending through the chassis, and a pair of castor wheels, wherein the apparatus for assisting travel includes tracked apparatus associated with the manually rotatable drive wheels, and apparatus for decouplably mounting the tracked apparatus onto the chassis, externally of the manually rotatable drive wheels.

27 Claims, 15 Drawing Sheets

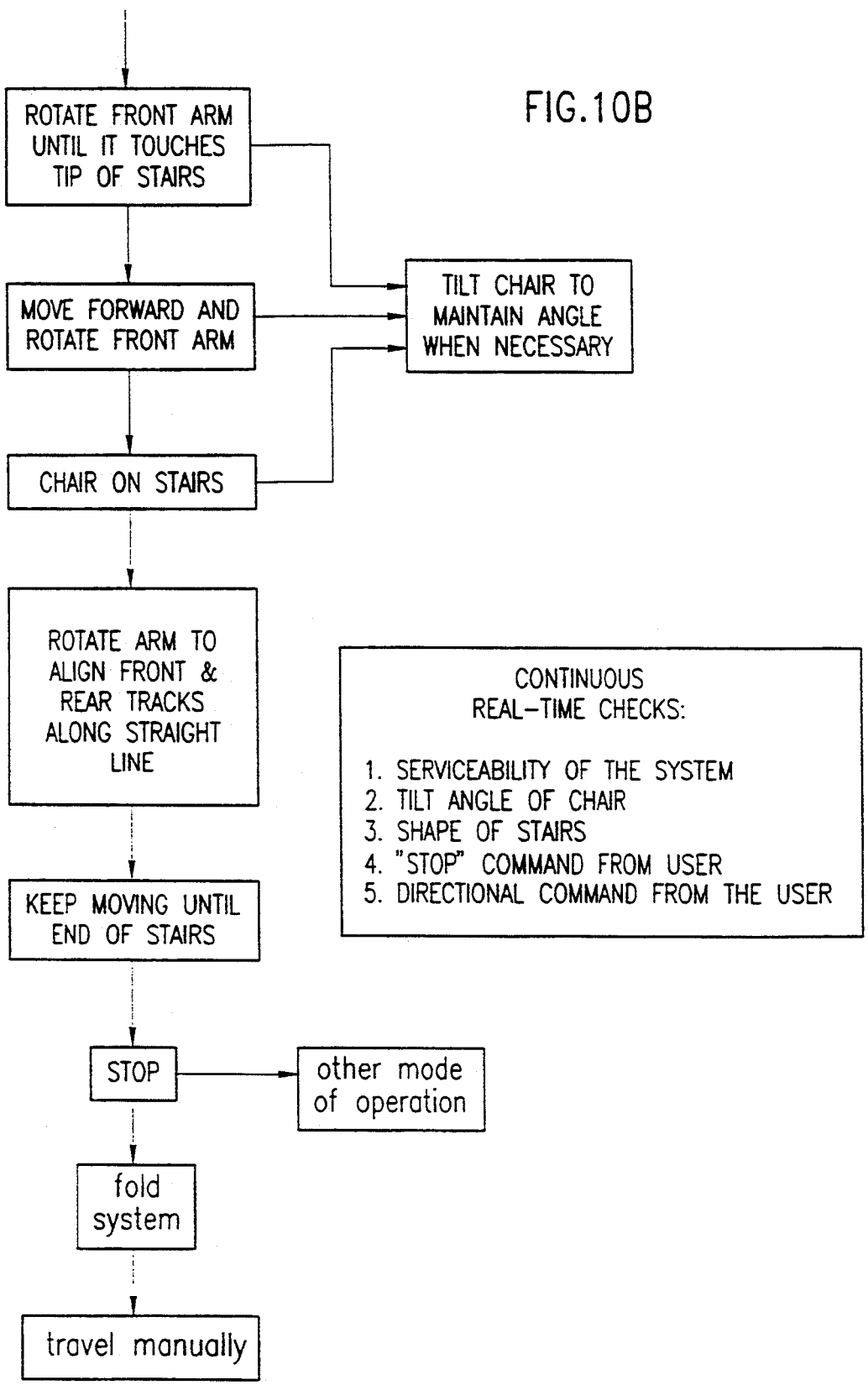

EXTERNALLY MOUNTED TRACK APPARATUS FOR A WHEEL CHAIR

FIELD OF THE INVENTION

The present invention relates generally to apparatus for assisting the travel of wheelchairs along surfaces that are generally not traversable by wheeled means, and, in particular, to tracked travel assistance apparatus for wheelchairs.

BACKGROUND OF THE INVENTION

There are known various types of travel assistance devices for wheelchairs, utilizing tracks for travel along surfaces that prohibit wheeled travel therealong. Such devices include wheelchairs having a built-in auxiliary tracked travel facility, tracked carrier devices for conveying wheelchairs along stairways, and travel devices employing tracks only.

An indication of the state of the art is found in the references that follow.

German Patent No. 3,617,518, describes a wheelchair having both wheeled and tracked travel means. The tracked means is permanently mounted on the wheelchair, and no means are provided for readily decoupling the tracked means from the wheelchair.

U.S. Pat. Nos. 4,671,369, 4,674,584 and 4,915,184 describe a wheelchair having both wheeled and track belt travel means. The described wheelchair is purpose-built and is not readily collapsible. Additionally, the track belt travel means, being an integral part of the wheelchair, is a permanent feature thereof, and is thus not readily detachable therefrom.

The following publications describe wheelchairs having integral wheel and track means. The publications are U.S. Pat. No. 3,198,534; U.K. Patent No. 693,983; and German Patent No. 3,827,607. In all of the devices described in the foregoing publications, the track means are neither readily couplable to nor decouplable from the remainder of the wheelchair.

The following publications describe wheelchairs having track means for selectably engaging inclined surfaces, such as stairways, thereby permitting travel therealong. The publications are: published French Patent Application No. 2,615,100; U.S. Pat. No. 3,191,953; published German Patent Application No. 3,827,607; U.S. Patent Nos. 3,602,522, 3,111,331, and 3,146,841. In none of the devices described in the foregoing publications are the track means either readily couplable to or decouplable from the remainder of the wheelchair.

Published German Patent Application No. 3,150,193 relates to a purpose-built vehicle having wheeled travel means and selectably deployable tracked travel means.

The following references relate to stair climbing wheelchair carriers: U.S. Pat. Nos. 4,432,426; 4,401,178; 4,566,550; 4,566,706; and 4,771,839; published European Patent Application No. 0,213,394; and Canadian Patent No. 1,150,333. In each of the references, a carrier travels on powered tracks, and is configured to support a wheelchair. With guidance from an operator, the carrier, together with the wheelchair and a person seated thereon, may be driven along a stairway. The wheelchair must be removed from the carrier before wheeled travel can be resumed.

U.S. Pat. No. 4,898,256 describes a further stair climbing wheelchair carrier. The carrier, which travels on powered tracks, is configured to receive a wheelchair and, with guidance from an operator, the carrier, together with the wheelchair and a person seated thereon, may be driven along a stairway. The main travel wheels of the wheelchair may be retained in contact with a ground surface so as to permit limited use of the wheels, so long as the tracks are in a raised position, spaced from the ground surface. This limited use of the wheels is provided, however, when the wheelchair is in a tilted back position, such that the wheelchair is supported on the ground by its main travel wheels and a rear-located roller forming part of the wheelchair carrier.

U.S. Pat. No. 4,411,330 describes stair climbing apparatus for a wheelchair or the like. The climbing apparatus, which travels on powered tracks, has a platform configured to permit the ascent and support thereon of a wheelchair, for example, such that the carrier, together with the wheelchair and a person seated thereon, may be driven along a stairway. The wheelchair must be removed from the climbing apparatus before wheeled travel can be resumed.

U.S. Pat. No. 3,869,011 and published European Patent Application No. 0,299,839 relate to tracked vehicles having no facility for wheeled travel.

The following publications relate to wheelchairs having a stair climbing ability provided by other than tracked means: U.S. Pat. Nos. 3,269,478; 3,438,641; 3,592,282; and 4,569,409.

SUMMARY OF THE INVENTION

The present invention seeks to provide apparatus for assisting the travel of wheelchairs along surfaces that are generally not traversable by wheeled means, wherein the apparatus may be easily and quickly connected to a wheelchair without the use of tools, and wherein the apparatus does not interfere with the normal functions of the wheelchair.

A feature of the invention is that the apparatus is intended for connection to and removal from a wheelchair, and so as to enable travel thereof, solely by a person seated therein and without resort to assistance from another person.

There is provided, therefore, in accordance with an embodiment of the invention, apparatus for assisting travel across a travel surface not suitable for traverse by a wheelchair having a chassis, a seat mounted onto the chassis, a pair of manually rotatable drive wheels mounted about a rotation axis extending through the chassis, and a pair of castor wheels. The apparatus for assisting travel includes tracked apparatus associated with the manually rotatable drive wheels, and apparatus for decouplably mounting the tracked apparatus onto the chassis, externally of the manually rotatable drive wheels.

Additionally in accordance with an embodiment of the invention, the chassis defines a pair of first mating portions aligned along an axis extending transversely through the chassis, the tracked apparatus includes a pair of track assemblies each having a second mating portion configured for mating with one of the first mating portions, and the apparatus for decouplably mounting includes apparatus for permitting mutual locking engagement of the first and second mating portions in response to a resultant force component of at least a predetermined magnitude acting in a first direction along the axis, and for permitting decoupling of the first and second mating portions in response to a resultant force component of at least a predetermined magnitude acting, along the axis, in a second direction, opposite to the first direction.

Further in accordance with an embodiment of the invention, a pair of manually drivable rim members are mounted onto the manually rotatable drive wheels for coaxial rotation therewith. The rim members are arranged for manual engagement in a first space parallel to a predetermined arc subtended from the rotation axis in a plane generally perpendicular thereto, and the tracked apparatus is arranged, when not in use, to occupy a second space not overlapping with the first space, thereby not preventing the manual engagement of the rim members.

Additionally in accordance with an embodiment of the invention, the tracked apparatus includes selectably deployable track apparatus operative, in a deployed mode, to permit travel of the wheelchair along a surface not suitable for wheeled travel, the tracked apparatus being arranged, when in a non-deployed mode, to occupy a space external and lateral to the wheelchair, thereby not preventing steering thereof, and thereby also not obstructing mounting of the wheelchair nor dismounting therefrom by a person.

Further in accordance with an embodiment of the invention, the chassis includes a pair of wheel mounting members arranged along the rotation axis and defining a pair of free end portions, and the first mating portions are defined by the free end portions of the axle members such that the apparatus for decouplably mounting includes apparatus for decouplably mounting the tracked apparatus onto the axle members.

BRIEF DESCRIPTION OF THE DRAWINGS

The present invention will be more fully understood and appreciated from the following detailed description, taken in conjunction with the drawings, in which:

FIGS. 10A and 10B together provide a flow chart representation of a typical sequence of operations in performance of a downward descent in accordance with the present invention.

DETAILED DESCRIPTION OF THE INVENTION

Figure 1A:
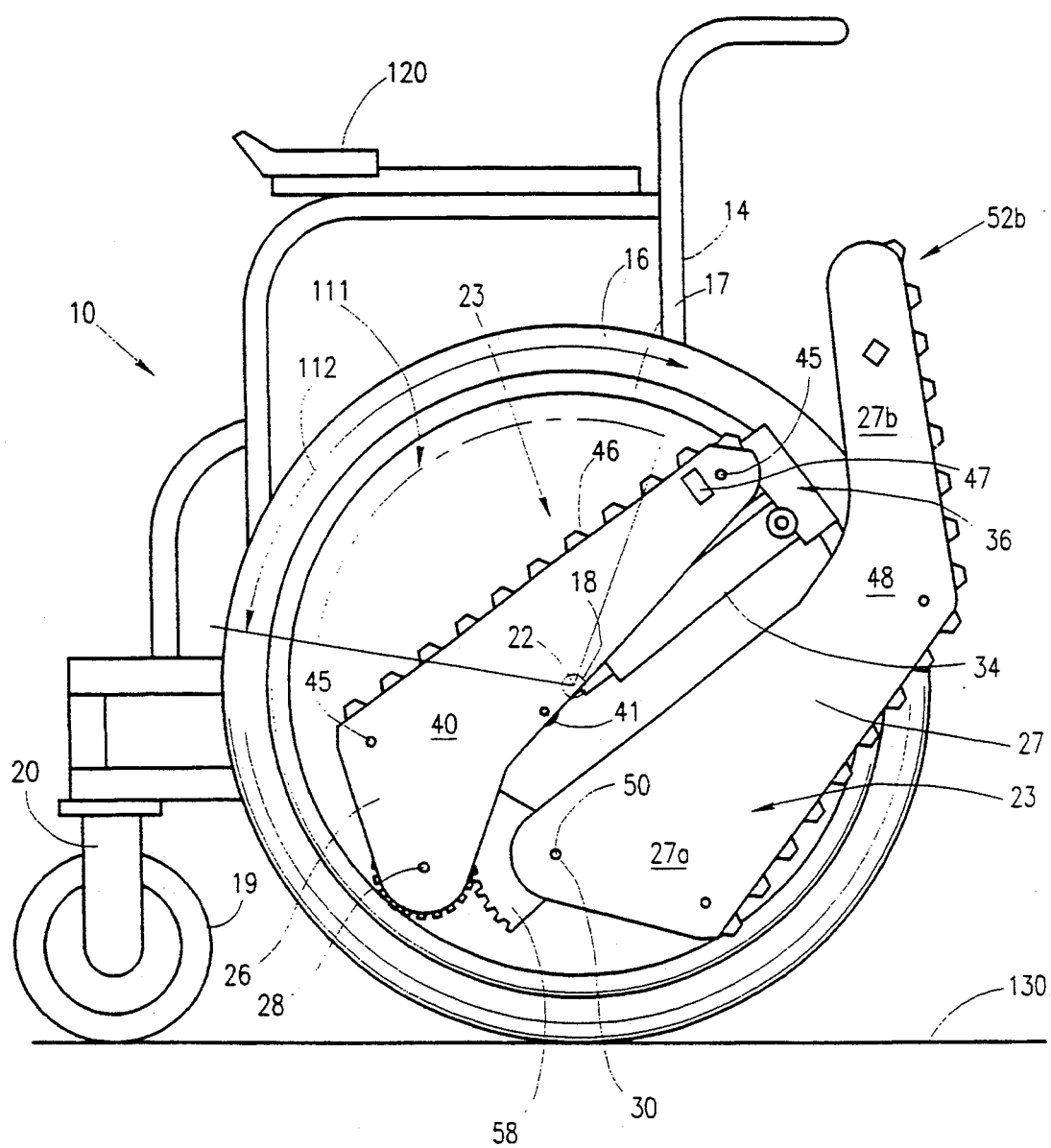
FIG. 1A is a left side view of a wheelchair on which is mounted travel assistance apparatus constructed and operative in accordance with the present invention.
Figure 1B:
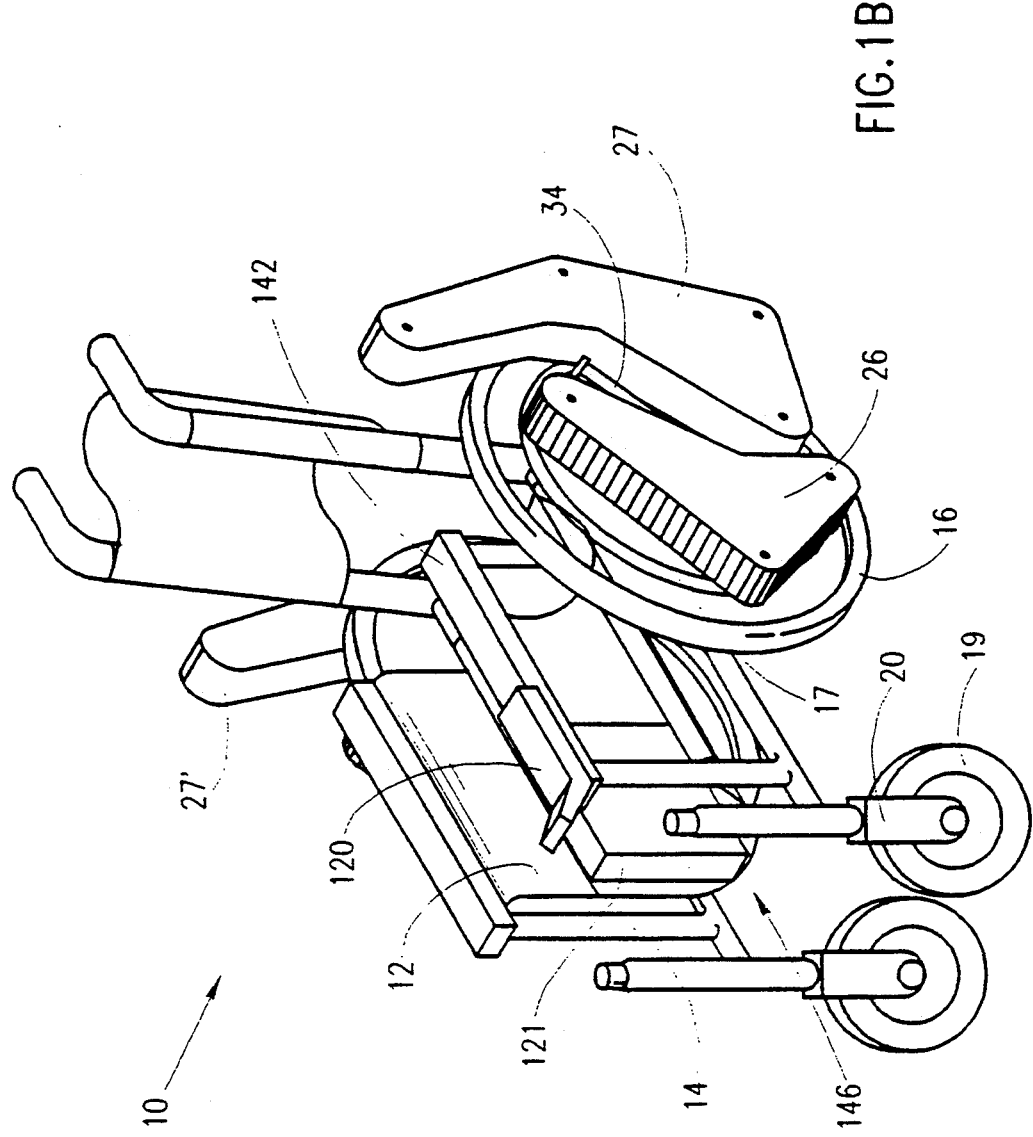
FIG. 1B is an isometric view of the wheelchair and travel assistance apparatus of FIG. 1A, wherein both the wheelchair and the travel assistance apparatus are folded.
Figure 1C:
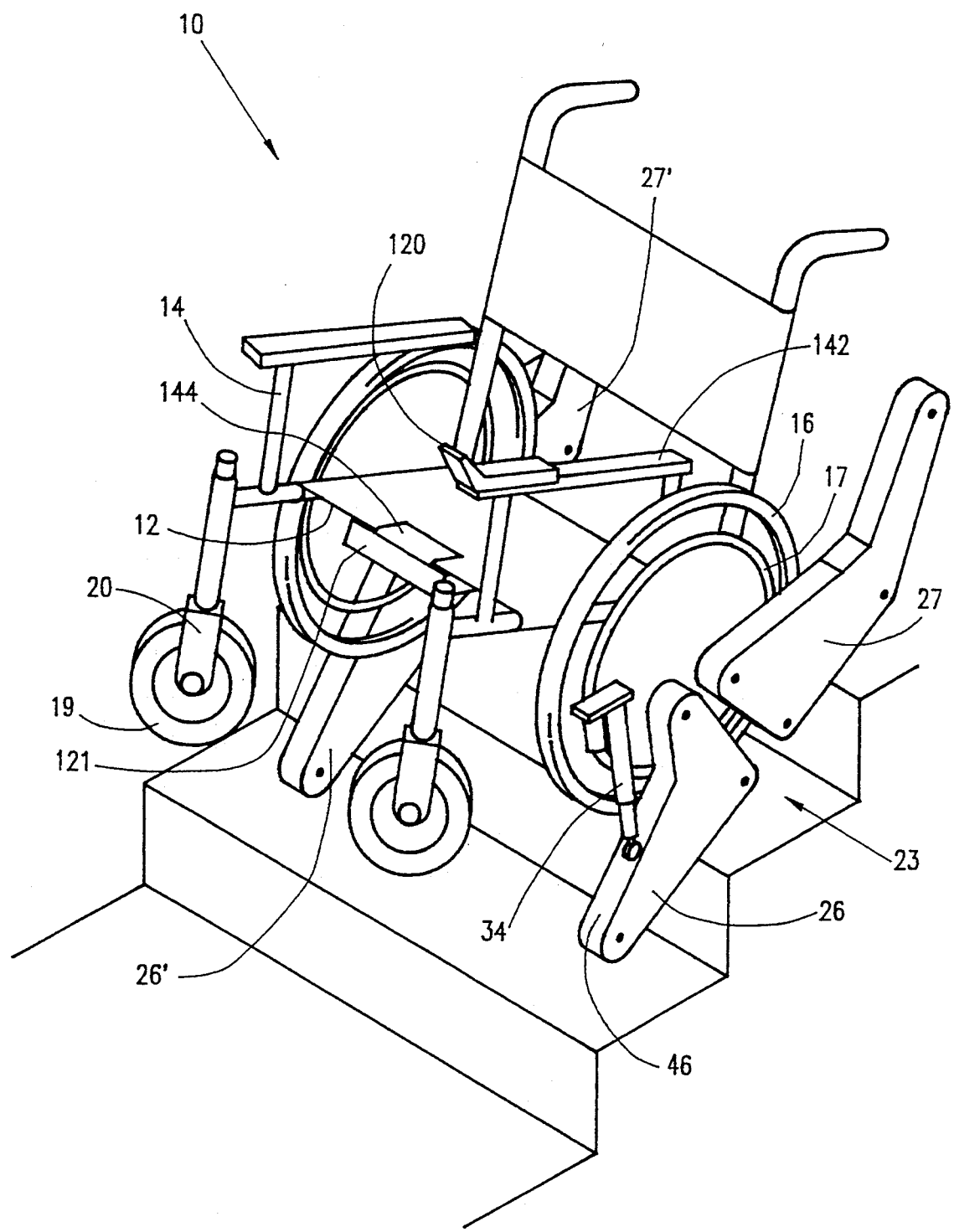
FIG. 1C is an isometric view of the wheelchair and travel assistance apparatus of FIGS. 1A and 1B, but wherein the wheelchair is traveling along a stairway.

Reference is now made to FIGS. 1A–1C, in which is illustrated a wheelchair, referenced generally 10, having mounted thereon travel assistance apparatus constructed in accordance with the invention. The travel assistance apparatus is operative to assist wheelchair travel across a travel surface not suitable for traverse by wheelchairs which rely solely on wheeled means. Such travel surfaces may be stepped surfaces such as curbs and stairways, uneven surfaces such as unpaved paths, and unconsolidated surfaces such as sand and shingle beaches, for example.

As will be appreciated from the ensuing description, the travel assistance apparatus of the invention is intended for use with a conventional, manually driven, foldable wheelchair having a virtually unmodified chassis, and is constructed in such a manner so as to be easily and quickly attachable to and removable from the wheelchair and which, when mounted on the wheelchair but not in actual use, does not interfere with the normal operation thereof.

The wheelchair with which the travel assistance apparatus has, as stated, a generally conventional structure, having a seat 12 (FIGS. 1B and 1C), a chassis or support frame 14, a pair of manually rotatable drive wheels 16 mounted onto colinear wheel axles 18 (shown in broken outline in FIG. 1A), and a pair of castor wheels 19 mounted via mounting members 20 onto the support frame 14. The wheel axles 18 define a drive wheel rotation axis 22 extending laterally through the support frame 14. Manual rotation of the drive wheels 16 is enabled by provision thereon of hand rims 17.

The apparatus for assisting travel includes a pair of track assemblies 23 mounted, onto respective left and right wheel axles 18 via quick coupling apparatus, shown and described below in conjunction with FIGS. 4 and 5.

Each track assembly 23 includes a housing 24 on which are mounted front and rear track units, respectively referenced 26 and 27. The front and rear track units are mounted onto housing 24 for selectable rotation about respective first and second rotation axes 28 and 30 which extend transversely through the housing 24 and which are generally parallel to drive wheel rotation axis 22. Each track assembly 23 further includes motive apparatus 32 (FIGS. 2B and 8) for driving the track units in a selected direction, and positioning apparatus 34 (FIGS. 2A, 2B, 8 and 9) for selectably rotating the pair of track units 26 and 27 so as to bring them into any selected operational position.

The powered functions of the travel assistance apparatus are controlled via a main controller 119 (FIG. 7), which forms part of a control and display unit 120 (FIGS. 1A, 1B, 1C, 6 and 7), which is typically mounted onto an arm rest 142 (FIGS. 1B and 1C) of the wheelchair 10. Main controller 119 is based on a controller such as controller 386, 8051 or 8096, manufactured by Intel Inc., U.S.A. Controller 119 is powered via a portable power source 121 (FIGS. 1B, 1C, 6 and 7), and supplies power to the remainder of the travel assistance apparatus.

Power source 121 is typically a 24 V DC rechargeable battery, attached as by a suitable clip 144 to a portion 146 of seat 12, as illustrated in FIG. 1C. When the wheelchair is folded, the battery may be removed and placed in a fold of the wheelchair seat portion 146, as illustrated in FIG. 1B.

According to the present embodiment, although the operation of the travel assistance apparatus is computer aided, a person seated in the wheelchair is required to perform certain tasks in order to operate the wheelchair in its travel assisted mode. One example of this is the mounting of the track assemblies 23 onto the wheel axles 18, as described below in conjunction with FIGS. 4 and 5. A further example is the initial deployment of the track units 26 and 27 from the folded, non-operational position illustrated in FIG. 1A, to an extended position, similar to the position illustrated in FIG. 2A, but prior to activation of the apparatus.

Figure 2A:
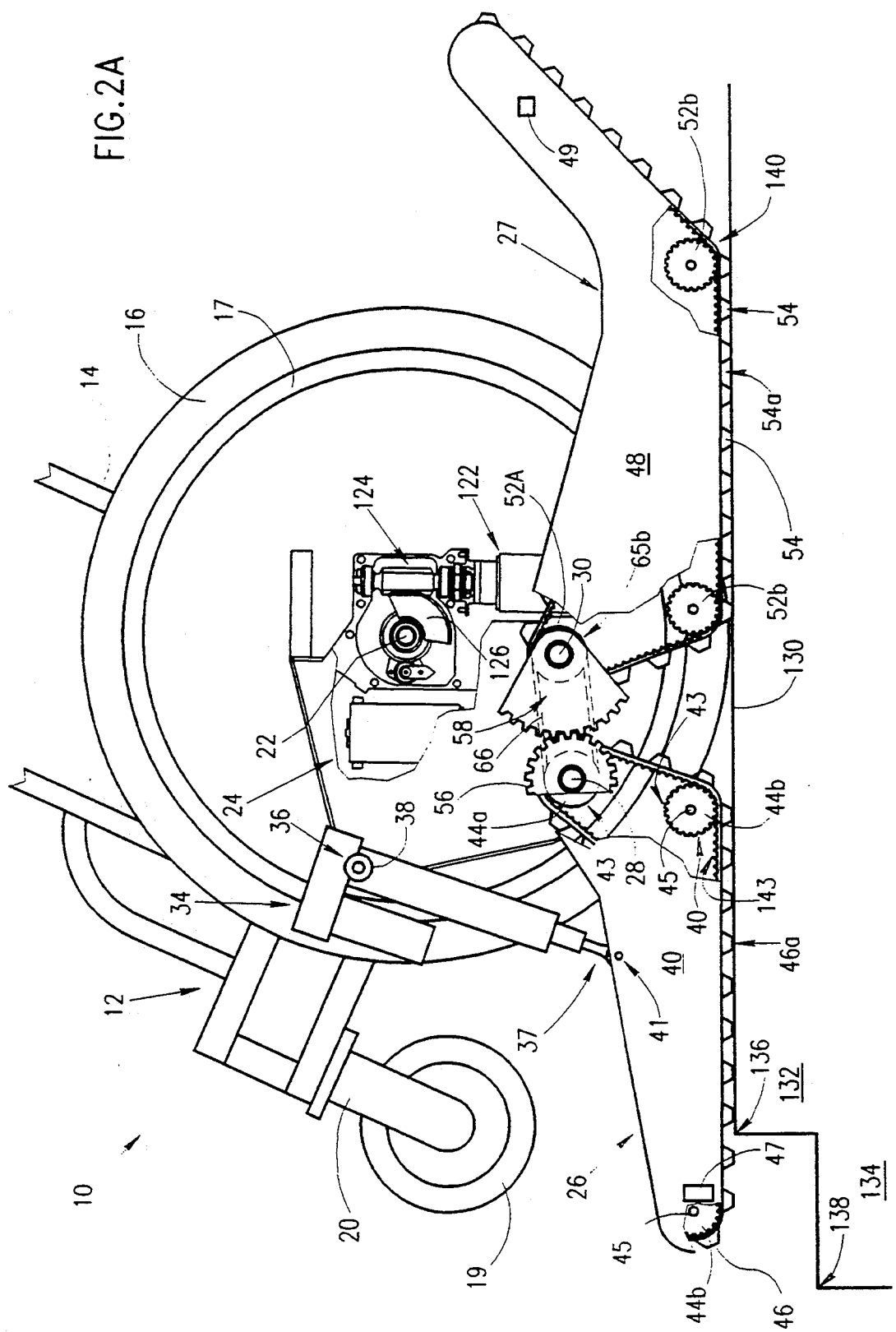
FIG. 2A is a view corresponding to that of FIG. 1A, but wherein track units of the travel assistance apparatus have been deployed and the wheelchair has been tilted backwards, prior to initiating a descent down a stairway.
Figure 2B:
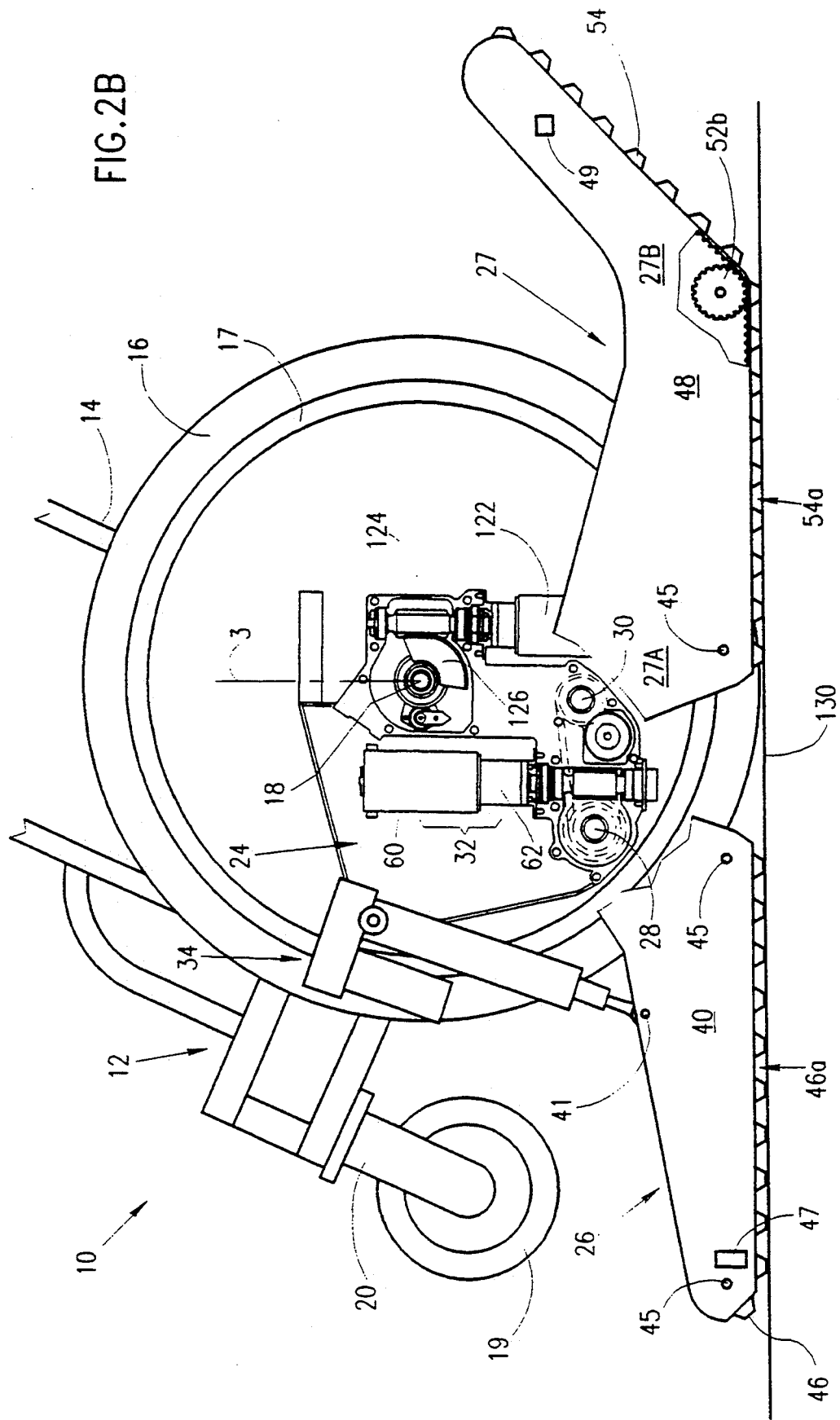
FIG. 2B is a view corresponding to that of FIG. 2A, but wherein the housing of the travel assistance apparatus has been partially cut away so as to expose the interior thereof.

Referring additionally to FIGS. 2A and 2B, once the track units 26 and 27 have been deployed as shown, a first end 36 of positioning apparatus 34 must be connected to housing 24, as by engagement thereby of suitable pin means 38, at a bore (not shown) provided at a predetermined position on housing 24. In the views illustrated in FIGS. 2A and 2B, the bore is hidden behind pin means 38 and is thus not visible.

The positive connection of apparatus 34 to housing 24 is sensed via a mounting switch 29 (FIG. 7) associated with controller 119. Only after positive connection of apparatus 34 has been sensed, can it be operated so as to move and control track units 26 and 27. Typically, positioning apparatus 34 is a suitable type of linear actuator apparatus. A second end 37 of positioning apparatus 34 is hingedly connected to front track unit 26, in a manner described below.

As shown, the front track unit 26 includes a first support member 40 pin-mounted onto the housing 24 for movement about first rotation axis 28. Unit 26 also includes, according to the present example, a track drive wheel 44a and a plurality of idler wheels 44b rotatably mounted onto first support member 40, and a first continuous web or track element 46 mounted, under a predetermined tension force, onto wheels 44a and 44b.

Wheels 44a and 44b have formed thereon drive teeth 43 (FIGS. 2A and 2C) for meshing engagement with an inward-facing surface 143 of track element 26. Accordingly, when drive wheel 44a is rotated, it drives track element 26 with negligible backlash and, therefore, maximum control.

A downward looking range sensor 47, associated with controller 119 (FIG. 7), is mounted onto support member 40. Sensor 47 is used to monitor the height of front track unit 26 above a travel surface, thereby providing to the controller 119 an indication of a stair or curb, for example. Sensor 47 may be any suitable type of sensor, although typically it is an ultrasonic sensor, such as the Ultrasonic Range Meter manufactured by Polaroid Inc., U.S.A.

The rear track unit 27 includes a second support member 48 pin-mounted onto the housing 24 for movement about second plurality of idler wheels 52b rotatably mounted onto second support member 48, and a second continuous web or track element 54 mounted, under a predetermined tension force, onto wheels 52a and 52b, so as to be drivably engaged thereby, typically by drive teeth 143 in a manner similar to that in which track element 26 is driven. A rearward looking range sensor 49, similar to range sensor 47, is mounted onto second support member 48.

A particular feature of the track units, according to the present embodiment, is that, the wheel members and the web element mounted thereon have a fixed configuration wherein no folding or unfolding of the web element relative to the track unit is required at any time. This allows the web element to be mounted onto the drive and idler wheels under a predetermined, generally constant tension force.

Some prior art systems employ belts which are repeatedly unfolded and folded as they take up operative and nonoperative positions, thereby changing the tension in the belt and subjecting the belt support system to repeated mechanical stresses. The above-described fixed configuration of the web elements of the present invention, however, increases the overall control of the travel assistance apparatus and reduces the possibility of a breakdown thereof.

Support member 40 of front track unit 26 is connected to second end 37 of positioning apparatus 34 via a suitable hinge connection 41, such that retraction or extension of positioning apparatus 34 causes a corresponding, respective, clockwise or counterclockwise rotation of track unit 26, about first rotation axis 28.

According to the present embodiment, a rotational motion of front track unit 26 about first axis 28 is transmitted to rear track unit 27 via a gear wheel 56 and a gear sector 58 (FIG. 2A). Gear wheel 56 is attached to first support member 40 for rotation therewith about first rotation axis 28, and gear sector 58 is attached to second support member 48 for rotation therewith about second rotation axis 30. The gear wheel 56 and gear sector 58 have respective predetermined radii such that a predetermined transmission ratio exists between them. The gear ratio required is determined mainly by the respective positions of the front and rear track units when in folded and unfolded positions.

In FIG. 1A, wherein the illustrated track assembly 23 is mounted on the wheelchair but in a folded position, hand rim 17 is arranged to be gripped in a space 111 parallel to an arc indicated by double-headed arrow 112 subtended from the rotation axis 22 in a plane generally perpendicular thereto. The track assembly 23 is configured such that its constituent track units 26 and 27 do not overlap with the space in which the hand rim is gripped, and thus do not interfere with the normal, manual operation of the wheelchair.

Similarly, as is apparent from FIG. 1B, in which the wheelchair is shown in a folded position, the folding of the wheelchair is not obstructed by the presence of the track assemblies 23 thereon.

Referring now particularly to FIGS. 2A and 2B, track units 26 and 27 are shown in a deployed position, and positioning apparatus 34 is illustrated in a mounted or connected position, as described above. The wheelchair 10 is shown in a tilted back position, due to the commencement of a 'descent' mode of operation. Wheelchair 10 is also in a tilted position, as illustrated, just prior to termination of an 'ascent' mode. The various operative modes of the travel assistance apparatus of the invention are described more fully hereinbelow in conjunction with FIGS. 2B-10.

Figure 2C:
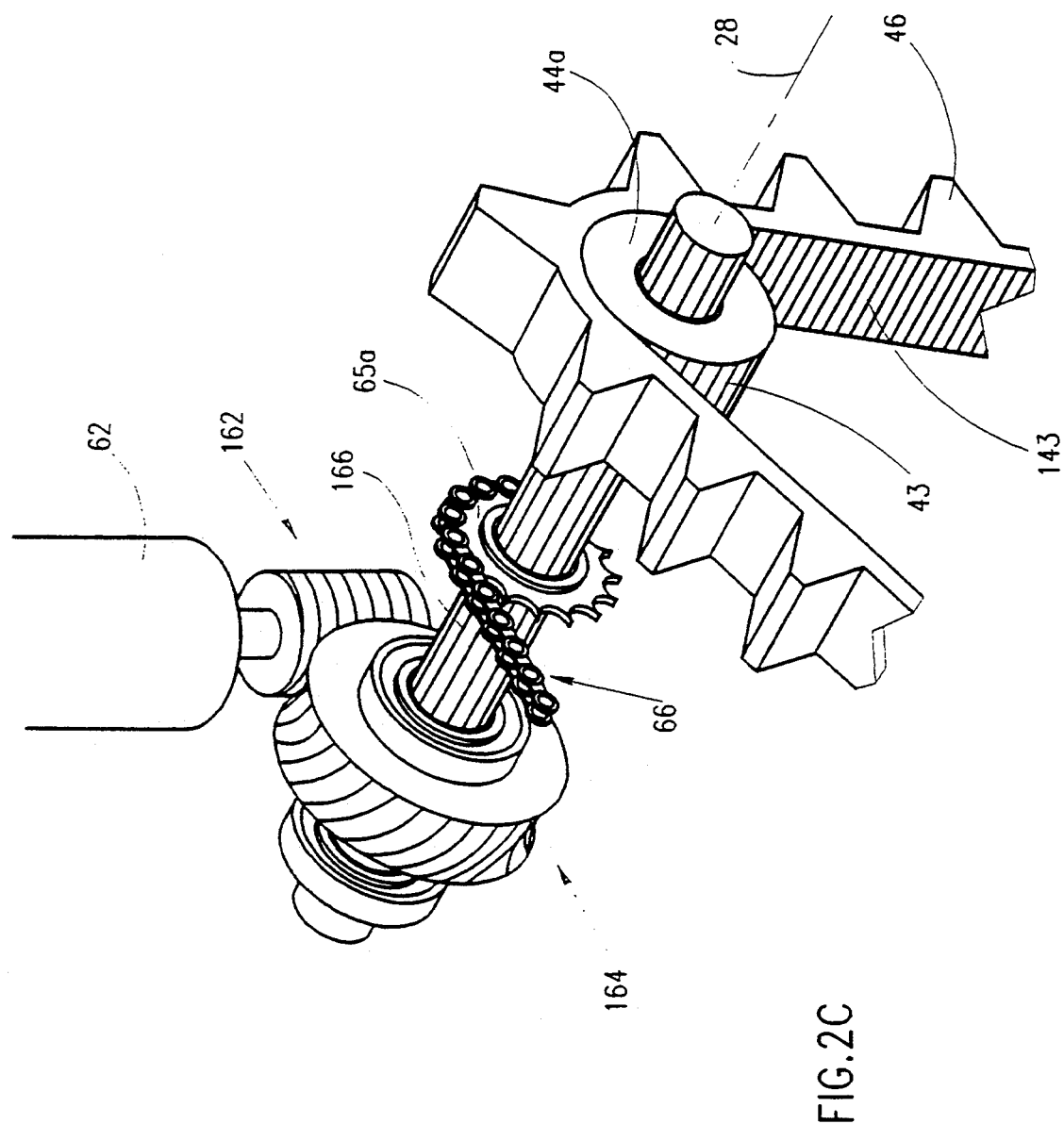
FIG. 2C is an isometric view of a portion of front track unit drive apparatus illustrated in FIG. 2B.

Referring now also to FIG. 2C, drive wheel 44a is arranged to be driven about first rotation axis 28 by motive apparatus 32. Motive apparatus 32 typically includes a suitable motor 60 and gear 62 (FIG. 2B) mounted onto housing 24. In the illustrated embodiment, gear 62 drives a worm 162 which drives a worm gear 164, mounted on an axle 166, about axis 28. The idler wheels 44b are mounted for rotation about fixed axes 45.

A first sprocket wheel 65a is rigidly mounted onto axle 166 for coaxial rotation with drive wheel 44a. Sprocket wheel 65a is operative, by means of an endless drive chain 66, to drive a second sprocket wheel 65b (FIG. 2A) which is mounted in rigid association with drive wheel 52a for coaxial rotation therewith. As sprocket wheels 65a and 65b have similar diameters, drive wheel 52a is rotated at the same speed as drive wheel 44a. Accordingly, the front and rear track units 26 and 27 have similar linear velocities.

Figure 3:
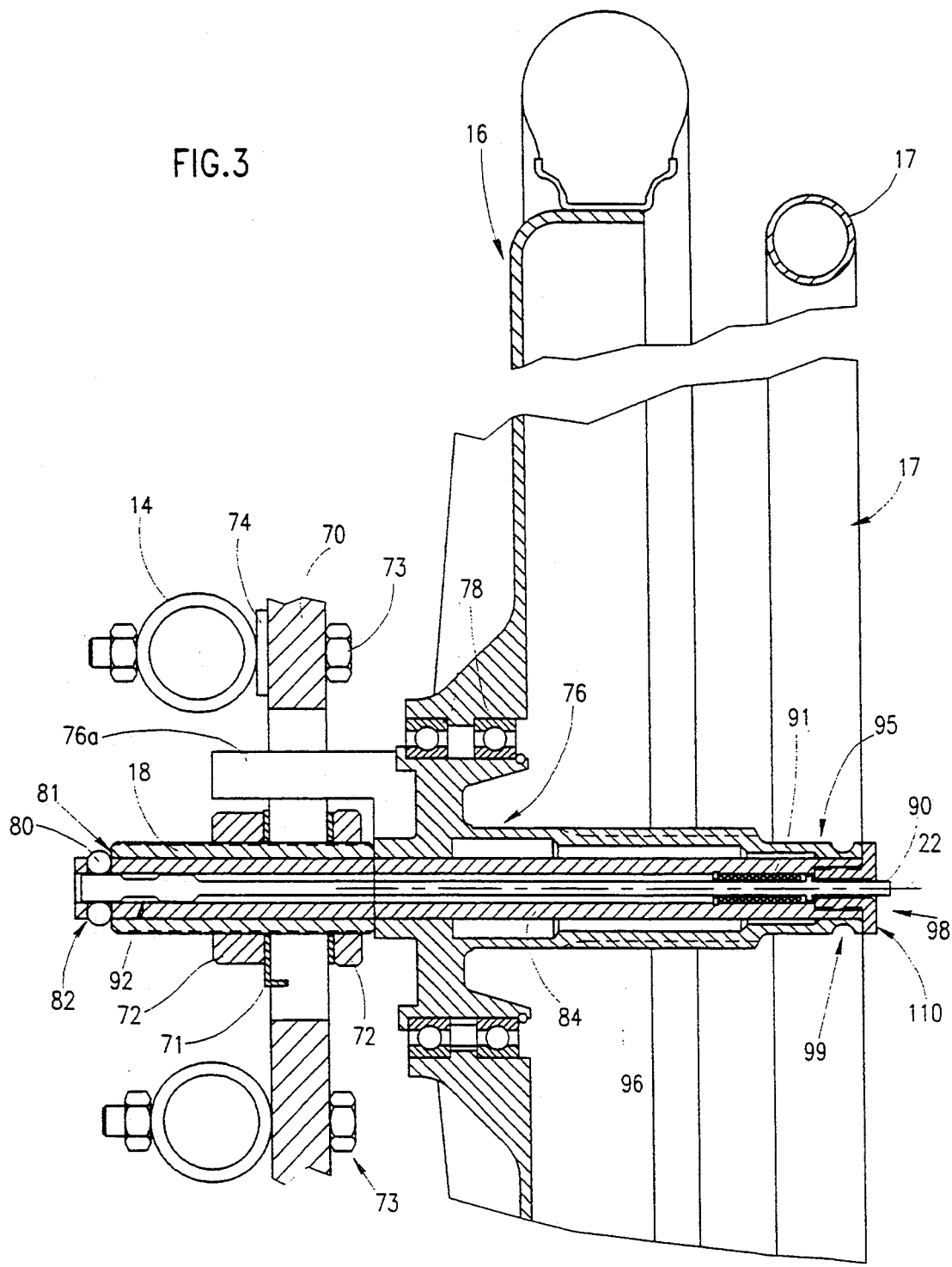
FIG. 3 is a cross-sectional view of the wheel and axle portions of the wheelchair illustrated in FIG. 2B, taken along the line 3—3 therein.
Figure 4:
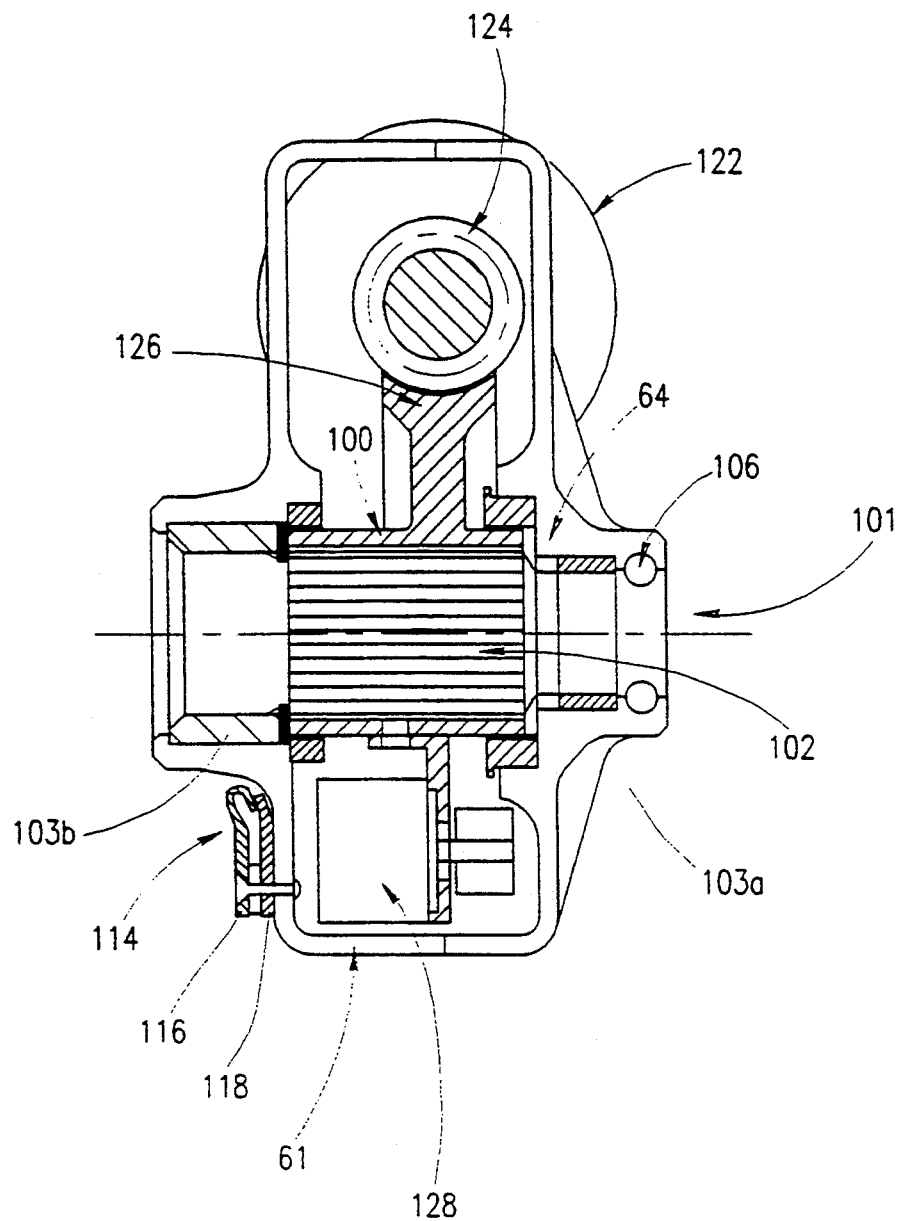
FIG. 4 is a cross-sectional illustration corresponding to that of FIG. 3, but showing only the travel assistance apparatus of the invention.
Figure 5:
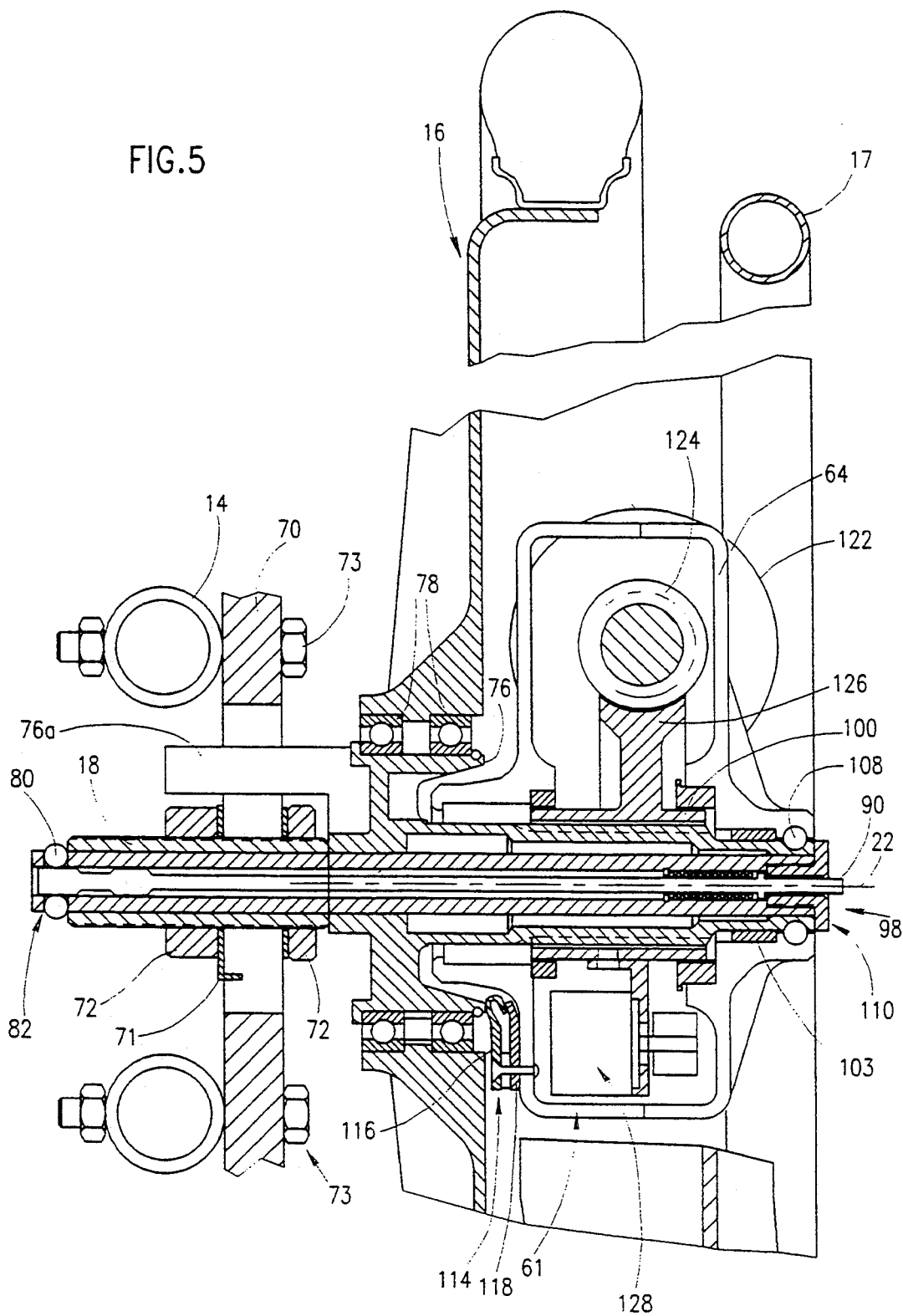
FIG. 5 is a cross-sectional illustration taken along line 3—3 in FIG. 2B, illustrating the mounting of the travel assistance apparatus of the invention onto a wheelchair.

Reference is now made generally to FIGS. 3-5, which illustrate the quick coupling apparatus by which the track assemblies 23 of the travel assistance apparatus of the invention are mounted onto the wheel axles 18 of wheelchair 10.

Referring now particularly to FIG. 3, the illustrated wheel axle 18 is mounted onto the wheelchair frame 14 via a wheel mounting block 70, a lock washer 71, locking nuts 72, and frame mounting bolts 73 (also shown in FIG. 5). A camber adjustment shim 74 is also provided for enabling adjustment of the wheel camber.

Drive wheel 16 is mounted onto axle 18 via a wheel hub 76 and wheel bearings 78. Wheel hub 76 is locked in a fixed position relative to the axle 18 by means of a quick release mechanism constituted by a pair of balls 80 and by a rod 84 extending internally of and coaxially with axle 18 and wheel hub 76. The balls 80 are located in bores 82 formed in rod 84. In the position illustrated, balls 80 are engaged with an end portion 81 of axle 18, and thereby prevent withdrawal of 84 from axle 18 and wheel hub 76, and removal of wheel 16 therefrom.

Depression of a knob-like, free-end portion 90 of rod 84, against a compression spring 91, causes an inward axial motion of rod 84, thereby bringing recesses 92 of rod 84 into registration with balls 80. This allows a radially inward movement thereof of the balls 80, such that they become disengaged from end portion 81 of axle 18 so as to permit removal of wheel 16 and wheel hub 76 from axle 18.

Wheel hub 76 defines a first mating portion, referenced generally 95, for decouplable engagement with a second mating portion 101 (FIG. 4) defined by track assembly 23. First mating portion 95 is comprised of a cylindrical, outward-facing, splined surface 96 defined by wheel hub 76. The splined surface 96 extends towards a free end 98 of the wheel hub. A circumferential groove 99 arranged in a plane perpendicular to axis 22 is provided adjacent to free end 98 of the wheel hub 76, and enable quick coupling of a track assembly 23 of the travel assistance apparatus of the invention, as described below in conjunction with FIGS. 4 and 5, via the first and second mating portions 95 and 101.

Referring now to FIGS. 4 and 5, an inner housing member 64, forming part of housing 24 of track assembly 23 (FIGS. 1A-2B) has attached thereto a mounting hub 100 and bearing portions 103a and 103b, which together form second mating portion 101. Mounting hub 100 has formed thereon an inward-facing, cylindrical, splined surface 102 (FIG. 4). Surface 102 has a diameter similar to that of outward-facing splined surface 96 (FIGS. 3 and 5) of wheel hub 76. Accordingly, mounting hub may be slidably mounted onto free end 98 of the wheel hub such that splined surfaces 96 and 102 mesh, thereby preventing relative rotation between the wheel axle 18 and track assembly 23.

In order to lock the track assembly 23 to wheel axle 18, there is provided a typically U-shaped, spring-loaded, locking pin 108 configured for insertion into a pair of linear grooves 106 (FIG. 4) formed on housing portion 64. Once the track assembly 23 has been engaged with wheel hub 76 such that locking pin 108 contacts an end surface 110 of the wheel hub 76, the locking pin 108 is outwardly so as to straddle grooves 99 and 106, thereby locking the track assembly 23 in a predetermined position along wheel rotation axis 22.

It will thus be appreciated that the mounting of a track assembly 23 onto its wheel hub 76 may be accomplished by aligning the second mating portion 101 of the track assembly 23 with the first mating portion 95 of the wheel hub 76, and by sliding the inward-facing splined surface 102 of second mating portion 101 along the outward-facing splined portion 96 of the first mating portion 95, in the direction of the wheelchair, until locking pin 108 engages an end surface 110 of wheel hub 76.

The application of at least a predetermined force component along the axis 22, in the direction of the wheelchair, will cause the locking pin 108 to be urged laterally into grooves 106, thereby permitting a small additional sliding movement of track assembly along the outward-facing splined surface 96, until pin 108 is brought into registration and engagement with groove 99. Locking springs (not shown) may be provided so as to prevent unintended release of locking pin 108 from grooves 99.

Figure 7:
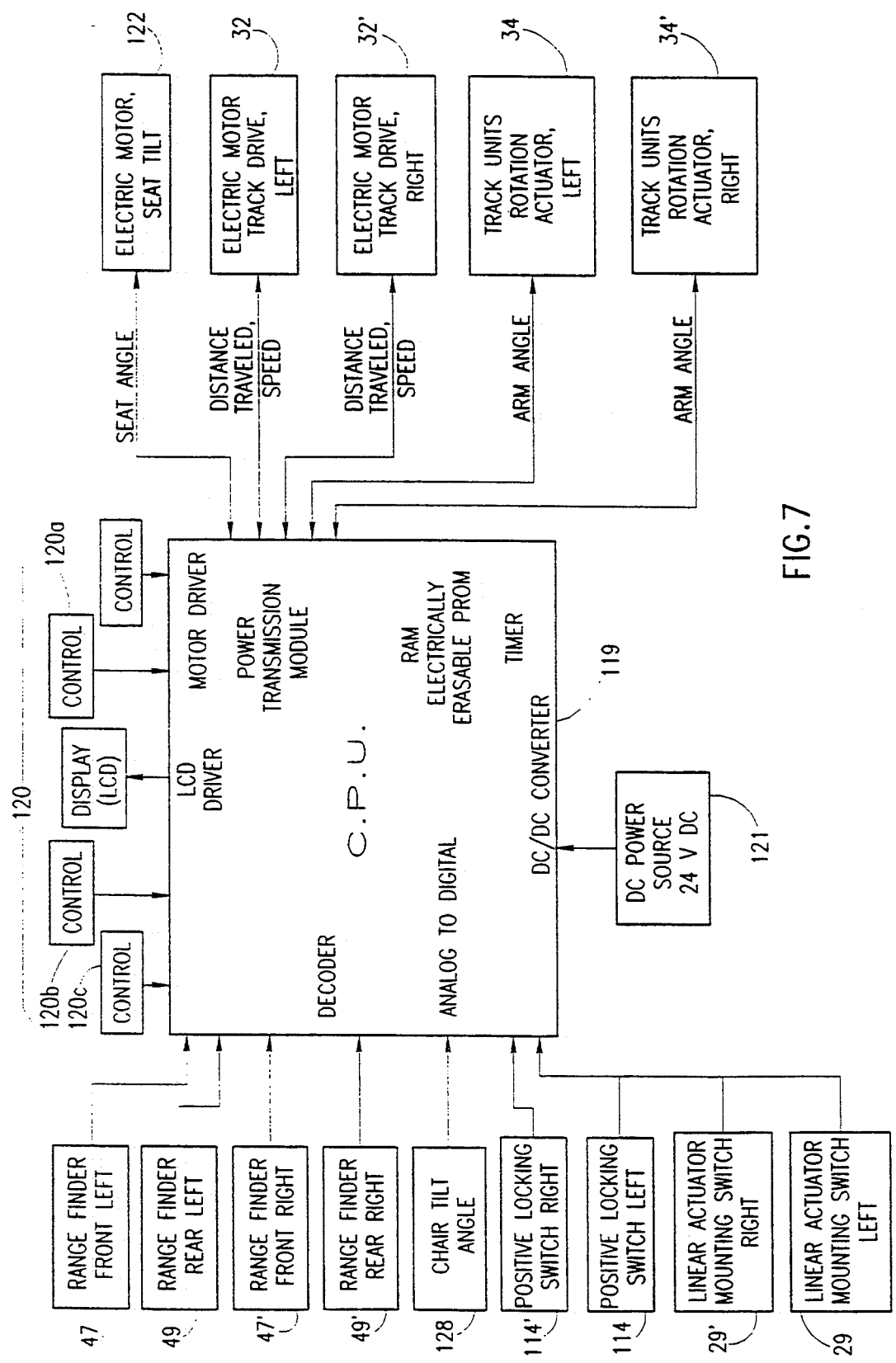
FIG. 7 is a general block diagram of electrical hardware employed in the present invention.

According to a preferred embodiment of the invention, there is also provided a positive engagement sensor 114 (FIGS. 4 and 5), which is mounted on a portion 61 of housing 24. Sensor 114 is an electrical switch device having first and second electrical connector portions 116 and 118. When track assembly 23 is brought into a fully mounted position, so as to be locked onto wheel hub 76, and is thus safe for use, first connector portion 116 is brought into contact with wheel hub 76 so as to be urged thereby into electrical contact with second connector portion 118, and thereby to provide an electrical signal to controller 119 (FIG. 7). Controller 119 interprets this signal as indicating that the associated track assembly is properly mounted on its associated wheel hub 76. If the track assembly becomes axially dislodged or if it is removed, the electrical contact between the first and second connector portions is broken, thereby indicating to the controller 119 that the track assembly is no longer properly mounted.

Referring now to FIGS. 2B, 4, 5 and 8, there is illustrated apparatus for rotating the wheelchair 10 about axis 22, relative to track assemblies 23. The apparatus includes a suitable gear motor 122, mounted onto housing 24, drivably associated with a worm 124 arranged in meshing contact with a worm gear sector 126 formed on mounting hub 100.

According to one embodiment, the rotation apparatus may be provided in either the left or right track assembly only, while, according to an alternative embodiment, rotation apparatus is provided in both the right and left track assemblies.

Activation of gear motor 122 causes rotation of worm 124, thus causing rotation of mounting hub 100, wheel hub 76 and wheelchair 10 about rotation axis 22. A rigid lever arm 76a (FIG. 3) is mounted onto wheel hub 76 and, upon rotation of the wheel hub 76, the lever arm 76a engages wheel mounting block 70 so as to aid the rotation of wheelchair 10 about rotation axis 22.

A suitable wheelchair angle sensor 128 (FIGS. 5, 8 and 9), such as a potentiometric pendulum sensor, associated with controller 119 (FIG. 7), is provided for monitoring the angle of tilt between the wheelchair and the track assembly.

Shown and described above in conjunction with FIGS. 1A-5 is the construction of a left-side track assembly 23. The right-side assembly, denoted hitherto also by reference numeral 23, has a similar construction to the left side track assembly.

Figure 6:
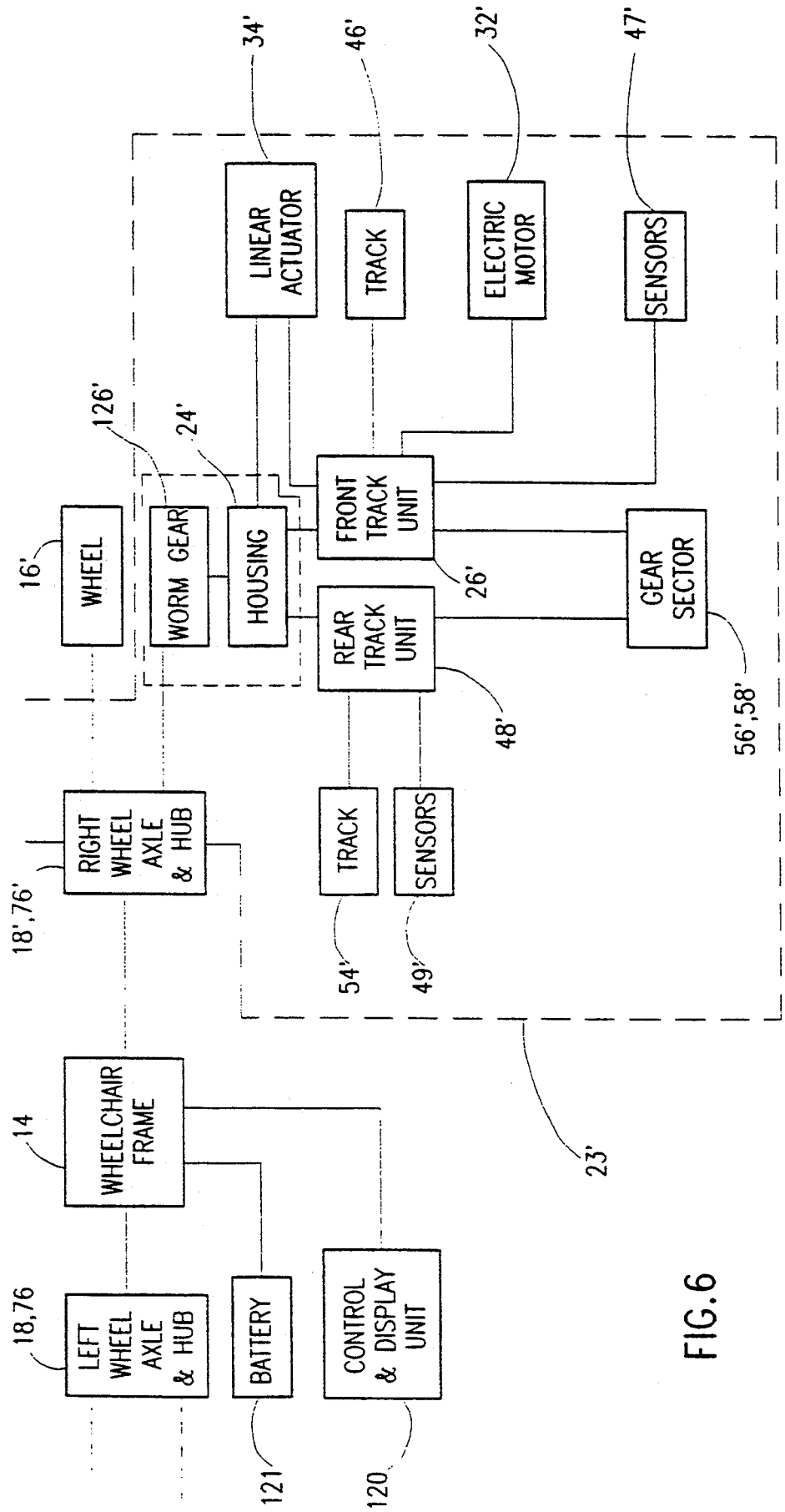
FIG. 6 is a general block diagram of the wheelchair and travel assistance apparatus illustrated in FIGS. 1A–3B.

Referring now briefly to FIG. 6, the interrelation between various portions of the wheelchair 10 and the travel assistance apparatus of the present invention is schematically illustrated. The track assembly exemplified herein is the right-side assembly, referenced herein 23'. The components which constitute track assembly 23' are identified by reference numerals similar to those used in conjunction with FIGS. 1A-5, but with a prime (') suffix. Hence, for example, whereas the support member of the rear track unit 27 of the left side track assembly 23 is referenced 48 in FIGS. 1A-2B, the corresponding support member of the right side track assembly 23' is referenced herein 48'.

It will be appreciated, however, that the mirror-image construction of the respective left and right track assemblies depicted in FIG. 6 is only applicable when the rotation apparatus for tilting the wheelchair relative to the track units is provided in both track assemblies.

Operation of the travel assistance apparatus of the invention is now described in conjunction with FIGS. 1A-10.

Initially, the pair of track assemblies 23 are mounted on the wheelchair 10, as described hereinabove in conjunction with FIGS. 3-5. Once the track assemblies have been mounted, a person seated in the wheelchair may either travel by manually rotating the drive wheels 16, of, if appropriate, he may choose to deploy the track units.

As described above with respect to FIG. 2A, according to the present embodiment of the invention, initial deployment of the track units is performed manually, as is the connection of free ends 36 of positioning apparatus 34 in a predetermined position on housing 24.

Once the track units have been initially deployed, such that a downward-facing surface 46a (FIGS. 2A and 2B) of first track element 46 and a downward-facing surface 54a (FIGS. 2A and 2B) of second track element 54 face a travel surface 130 (FIGS. 1A, 2A and 2B), and positioning apparatus 34 has been properly connected, control and display unit 120 (FIGS. 6 and 7) is energized via a passenger operated switch 120a (FIG. 7).

Subsequently, unit 120 performs self-checks on the travel assistance apparatus, including determining, via sensors 114 (FIGS. 4 and 5), whether the track assemblies are properly mounted, and including a check on the power level of the battery 121 (FIGS. 1B and 7).

If the self-checks are satisfactory, a mode of operation may be selected by the passenger. Typically, these modes include 'terrain', for traveling on ostensibly flat surfaces, 'stair climb', and 'stair descent'.

In the terrain mode of operation, the relative positions of the front and rear track units, 26 and 27, are maintained such that their respective bottom surfaces, 46a and 54a, are coplanar and maintain contact with the travel surface.

Figure 10A:
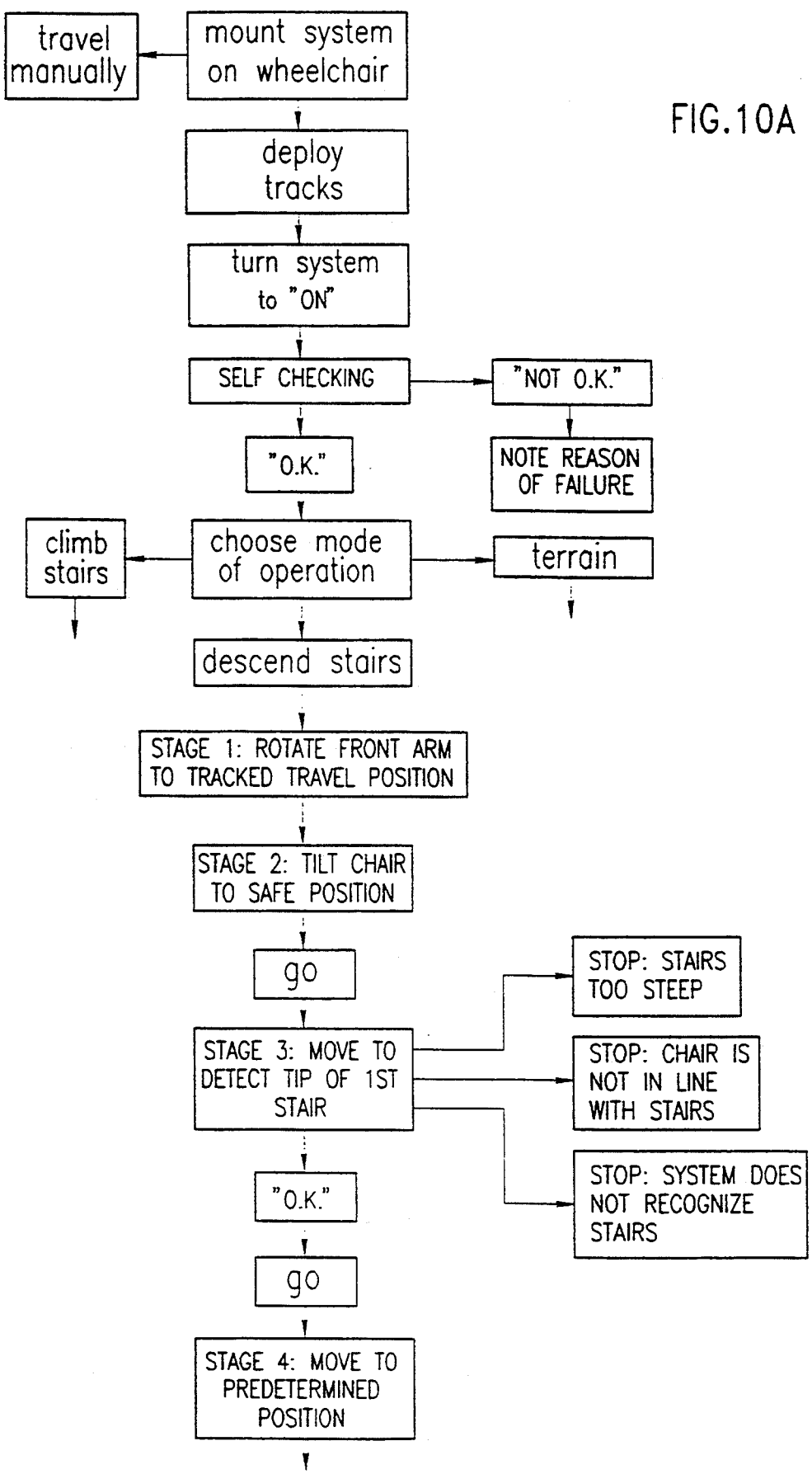

The following is a description of travel in a descent mode, generally as summarized in the flow chart of FIGS. 10A and 10B. It is noted that in these Figures legends in all capital letters denote controller operations and legends in small letters denote passenger operations. It will be appreciated that, unless specifically stated otherwise, each of the described stages is controlled via controller 119.

Referring now particularly to FIGS. 2A, 8, 9 and 10, a first step, once the descent mode has been selected is the rotation of the front track units 26 and 26' via positioning apparatus 34 until track surfaces 46a and 54a are coplanar and engage travel surface 130. This action lifts wheels 16 and 16' off travel surface 130. Subsequently, as a second stage, the wheelchair is tilted backwards as shown in FIGS. 2A and 2B, via motor 122 (FIGS. 2B, 4, 5 and 8), worm 124 and worm gear 126, to a predetermined reclining position at which the passenger can be safely supported while descending a stairway of no more than a predetermined gradient.

Figure 9:
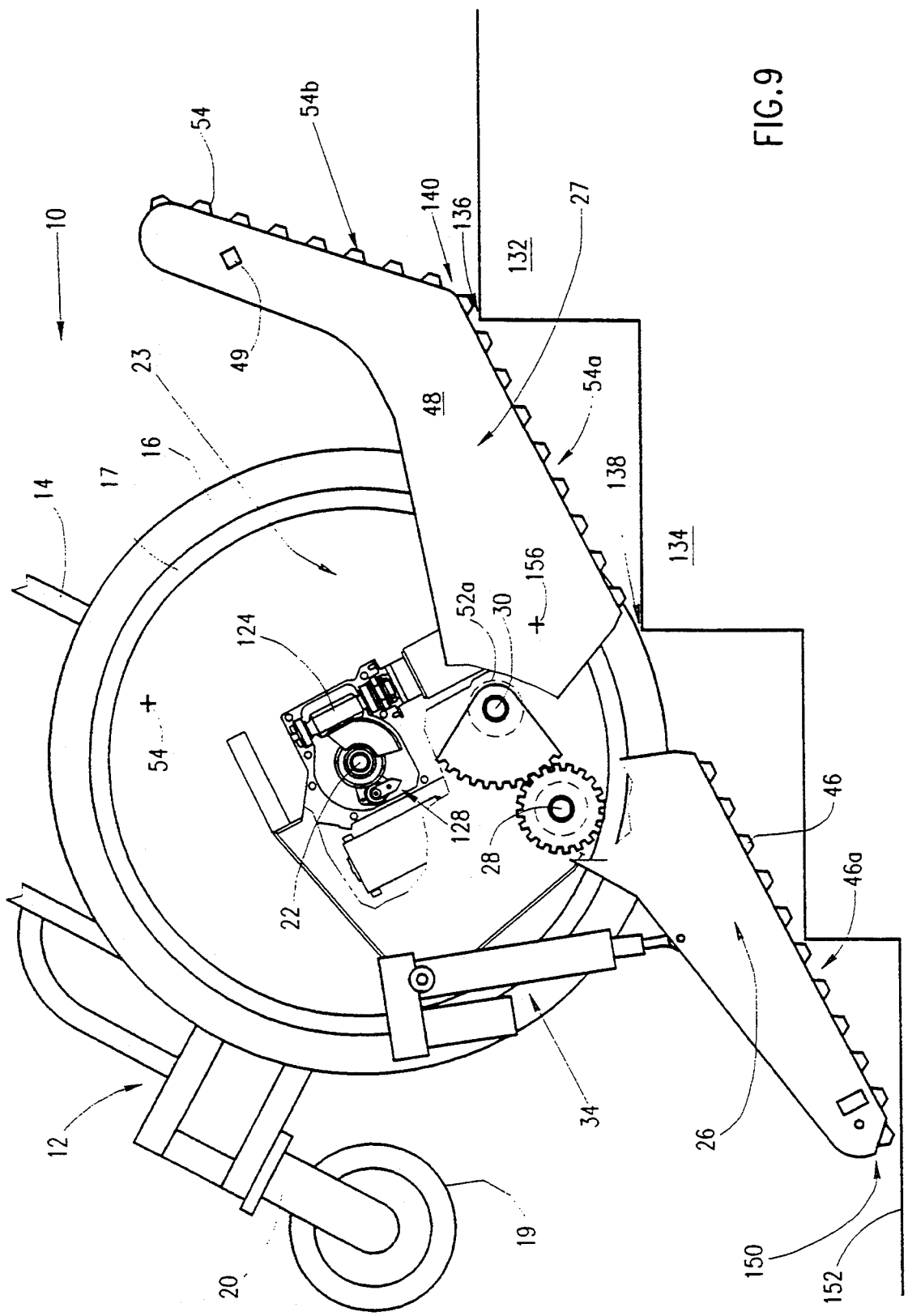
FIG. 9 is a view corresponding to that of FIG. 8, but showing yet a further stage of downward descent of the illustrated wheelchair.

According to a preferred embodiment of the invention, a desired reclining position is one in which greatest stability is provided, and is one in which the center of gravity (CoG) of the wheelchair, travel assistance apparatus and passenger, indicated in FIG. 9 at 154, is in vertical alignment with the geometric center 156 (FIG. 9) of the track assemblies 23 and 23'.

Thereafter, the passenger, when ready, moves a selector 120b (FIG. 7) into a 'go' position, and motive apparatus 32 (FIGS. 2B and 8) is activated so as to move the wheelchair forwards. The wheelchair is moved forwards on track assemblies 23 and 23' until the edge of the first stair 132 (FIGS. 2A, 8 and 9) is detected by downward-looking range sensor 47, as shown in FIG. 2A, and its horizontal position and its height or rise are recorded by the controller 119. The wheelchair continues moving forward until the edge of the next stair 134 (FIGS. 2A, 8 and 9) is detected.

At this stage, the controller is able to calculate the gradient of the stairway, based on the difference in height between the two stairs 132 and 134 and the distance traveled between the respective stair edges 136 and 138. If the stairway is too steep, i.e. the gradient is greater than a predetermined maximum safe gradient, further forward travel will not be permitted by the controller 119.

Similarly, if, by comparison of the output signals received from the left and right downward-looking range sensors, 47 and 47' respectively, the wheelchair is determined not to be in line with the stairway, such that descent therealong could lead to tipping of the wheelchair and would, therefore, be dangerous, forward travel will not be permitted. Continuation of forward travel will also be halted if a stair configuration is not recognized by controller analysis of the output readings from sensors 47 and 47'. Similarly, if the stair riser is too high, travel will also not be permitted.

If, however, a stairway configuration is recognized, the wheelchair is properly positioned, and the gradient does not exceed a safe gradient, the passenger may input a 'go' control, so as to move the wheelchair forward until predetermined respective lengths of front track units 26 and 26' are suspended over the stairway. If, according to the previously outlined criteria of gradient, positioning and stairway configuration, it is safe to proceed, travel continues via front track units 26 and 26', while, simultaneously therewith, front track units 26 and 26' are rotated via positioning apparatus 34, enabling initial downward travel of the wheelchair 10 along the stairway.

Figure 8:
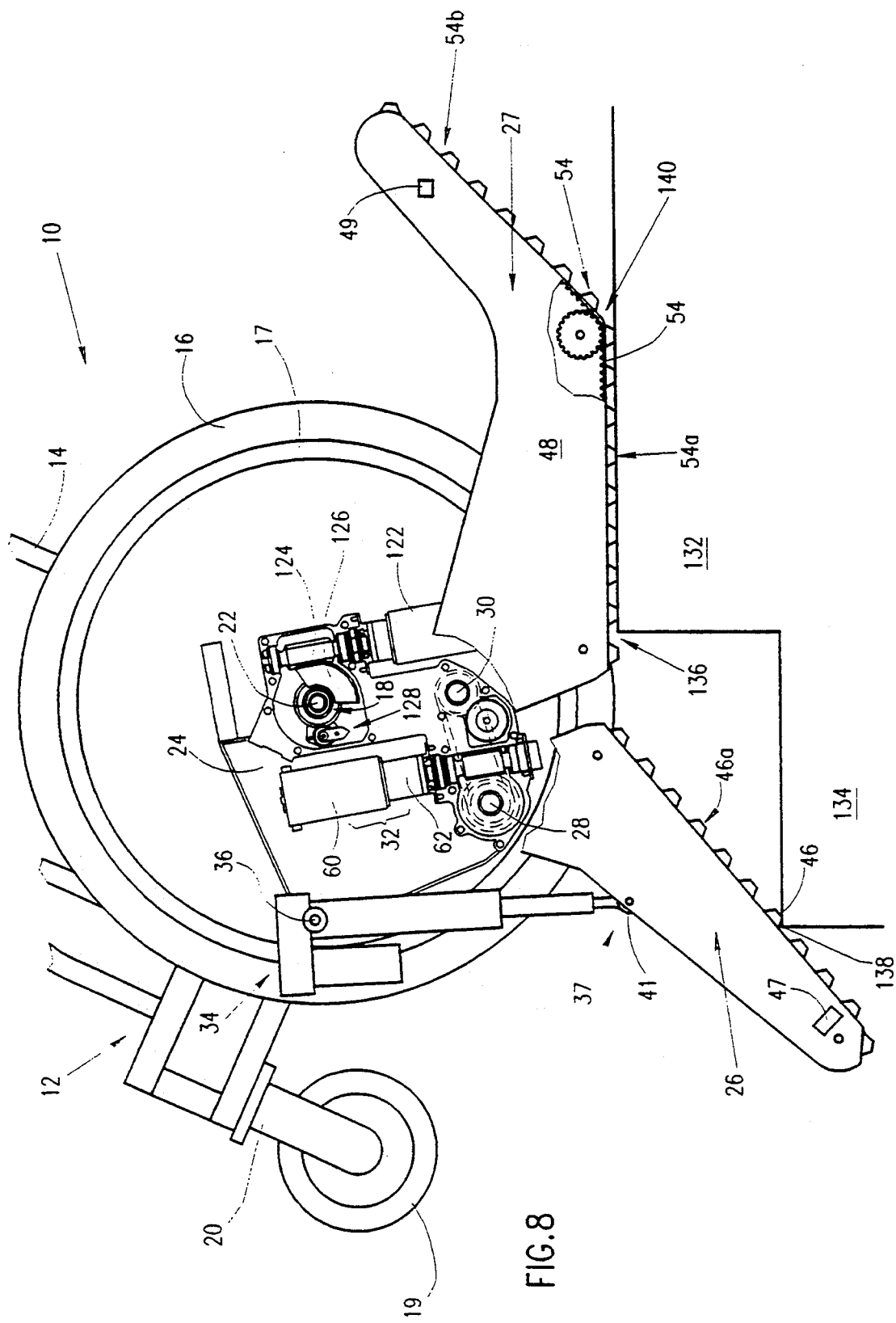
FIG. 8 is a view corresponding to that of FIGS. 1A and 3A, but wherein a descent down a stairway has commenced.

The wheelchair continues to move downward along the stairway, while rotating the front track units, until the rear track units 27 and 27' travel not on bottom web surfaces 54a, but on a transition portion 140 (FIGS. 8 and 9) between first and second arm portions 27a and 27b. Thereafter, the rear track units travel on rearward facing web surfaces, indicated at 54b, (FIGS. 8 and 9).

While the wheelchair continues to progress, positioning apparatus 34 is operated to gradually bring bottom web surfaces 46a and 54a into coplanar registration, such that they are fully supported on the stairs. This is depicted in FIG. 9.

Travel continues in this manner until front edge portions 150 (FIG. 9) of front track units 26 and 26' engage a travel surface 152 adjacent to the bottom of the stairway. As the wheelchair continues to travel forwards onto travel surface 152, via front edge portions 150, support of the wheelchair on the stairs is transferred from bottom web surface 54a to rear web surface 54b of track units 27 and 27', thereby preventing sudden dropping of the wheelchair between successive stairs. Once the bottom web surface 54a engages travel surface 152, the passenger may continue tracked travel as desired.

Alternatively, if the passenger wishes to resume manual, wheeled travel, he inputs a 'stop' command via a selector control 120c (FIG. 7), after which he may fold the track units to the position illustrated in FIG. 1A.

At all times during descent and climbing of the stairs, the tilt angle of the wheelchair is monitored via angle sensor 128. During climb and descent modes of travel the controller will cause further backwards rotation of the wheelchair relative to the track units, as required.

Travel in a climb mode is achieved, in general terms, by performing the above-described descent mode steps in reverse order and is thus not described herein. A noteworthy difference between ascent and descent modes is that, in the ascent mode, rearward looking range sensors 49 and 49' are employed, first, to detect the position and height of the stairs and, second, to detect to the termination or top of the stairs. Preferably, the climb mode entails backwards travel, such that the passenger has his back to the stairs at all times.

It will be appreciated by persons skilled in the art, that, the scope of the present invention is not limited to what has been particularly shown and described by way of example. The scope of the invention is limited, rather, solely by the claims, which follow.

What is claimed is:

1. Wheelchair apparatus comprising:
    a chassis;
    a seat mounted onto said chassis; and
    a travel drive associated with said chassis and comprising:
        a pair of manually rotatable drive wheels mounted about a rotation axle extending through said chassis at wheel mounting locations therealong, and
        a pair of castor wheels, said wheels being operative to support said chassis on a travel surface so as to enable wheeled travel of said chassis therealong;
        driven tracks mounted externally of the drive wheels and operative to assist travel of said chassis along a travel surface not suitable for traverse by said wheels.

2. Apparatus according to claim 1, and wherein said chassis defines a pair of first mating portions aligned along an axis extending transversely through said chassis, said tracked means comprises a pair of track assemblies each having a second mating portion configured for mating with one of said first mating portions, and said means for decouplably mounting comprises means for permitting mutual locking engagement of said first and second mating portions in response to a resultant force component of at least a predetermined magnitude acting in a first direction along said axis, and for permitting decoupling of said first and second mating portions in response to a resultant force component of at least a predetermined magnitude acting along said axis in a second direction opposite to said first direction.

3. Apparatus according claim 1, and wherein said wheeled means further comprises a pair of manually drivable members mounted onto said manually rotatable drive wheels for coaxial rotation therewith, and arranged for manual engagement in a first space parallel to a predetermined arc subtended from said rotation axis in a plane generally perpendicular thereto, said tracked means being arranged, when not in use, to occupy a second space not overlapping with said first space, thereby not preventing the manual engagement of said manually drivable members.

4. Apparatus according to claim 1, and wherein said tracked means comprises selectably deployable track means operative, in a deployed mode, to permit travel of said chassis along a surface not suitable for traverse by said wheeled means, said tracked means being arranged, when in a non-deployed mode, to occupy a space external of and lateral to said wheeled means, thereby not preventing steering thereof, and thereby also not obstructing mounting of said seating means nor dismounting therefrom by a person.

5. Apparatus according to claim 2, and wherein said chassis comprises wheel mounting means positioned along said rotation axle and defining a pair of free end portions, and wherein said first mating portions are defined by said free end portions of said wheel mounting means such that said means for decouplably mounting comprises means for decouplably mounting said tracked means onto said wheel mounting means.

6. Apparatus according to claim 5, and wherein said wheel mounting means is non-rotatably positioned along said rotation axle, and said wheelchair apparatus also includes rotational bearings for enabling rotation of said manually rotatable drive wheels about said rotation axle, and wherein said first and said mating portions include means for preventing relative rotation, about said rotation axle, between said wheel mounting means and said pair of track assemblies engaged therewith.

7. Apparatus according to claim 2, and wherein each said track assembly comprises:
    housing means defining said second mating portion;

first and second track units mounted onto said housing means for selectable rotation about respective first and second rotation axes extending transversely therethrough;

means for driving said track units; and means for selectably rotating said pair of track units so as to cause positioning thereof in extended and retracted positions, wherein said track units, when in said extended position, extend radially beyond said manually rotatable drive wheels thereby to engage the travel surface so as to support said chassis thereon, thereby permitting travel of said chassis along the travel surface via said track units in response to operation of said means for driving said track units.

8. Apparatus according to claim 7, and wherein said first track unit comprises:
a first support member mounted onto said housing means via said first rotation axis;
a first plurality of wheel members rotatably mounted onto said first support member; and
a first continuous web element mounted, under a predetermined tension force, onto said first plurality of wheel members, so as to be drivably engageable thereby, and said second track unit comprises:
a second support member mounted onto said housing means via said second rotation axis;
a second plurality of wheel members rotatably mounted onto said second support member; and
a second continuous web element mounted, under a predetermined tension force, onto said second plurality of wheel members, so as to be drivably engageable thereby.

9. Apparatus according to claim 8, and wherein said first plurality of wheel members includes a first track drive wheel arranged for rotation by said means for driving said track units and further arranged for frictional engagement with said first web element thereby to cause a driving motion thereof.

10. Apparatus according to claim 9, and wherein said second plurality of wheel members includes a second track drive wheel, and each said track assembly also includes means for transmitting a drive force from a predetermined one of said first plurality of wheel members to said second track drive wheel.

11. Apparatus according to claim 7, and wherein said means for selectably rotating said pair of track units comprises:
means for rotating a predetermined one of said first and second track units about the associated one of said first and second rotation axes; and
means, associated with said first and second track units, for transmitting a rotational motion applied to said predetermined one of said first and second track units to the other of said first and second track units.

12. Apparatus according to claim 1, and also including:
gradient sensing means for sensing the gradient of a stepped travel surface; and
means, associated with said gradient sensing means, for maintaining generally vertical alignment of the center of mass of said wheelchair apparatus and a person seated thereon with the geometric center of said tracked means.

13. Apparatus according to claim 1 and wherein said driven tracks comprise forward and rear track assemblies located laterally outward of each of the drive wheels, said forward and rear track assemblies being rotatable from an inoperative orientation to an operative orientation by rotation thereof about respective forward and rear track orientation axes which are parallel to but not coaxial with said rotation axle.

14. Apparatus for assisting travel across a travel surface not suitable for traverse by a wheelchair having a chassis, a seat mounted onto the chassis, a pair of manually rotatable drive wheels mounted about a rotation axle extending through the chassis, and a pair of castor wheels, said apparatus for assisting travel comprising:
tracks mounted on said rotation axle externally of the manually rotatable drive wheels.

15. Apparatus according to claim 14, and wherein the chassis defines a pair of first mating portions aligned along an axis extending transversely through the chassis, said tracked means comprises a pair of track assemblies each having a second mating portion configured for mating with one of said first mating portions, and said means for decouplably mounting comprises means for permitting mutual locking engagement of said first and second mating portions in response to a resultant force component of at least a predetermined magnitude acting in a first direction along said axis, and for permitting decoupling of said first and second mating portions in response to a resultant force component of at least a predetermined magnitude acting along said axis in a second direction opposite to said first direction.

16. Apparatus according to claim 14, and wherein a pair of manually drivable rim members are mounted onto the manually rotatable drive wheels for coaxial rotation therewith, and wherein the rim members arranged for manual engagement in a first space parallel to a predetermined arc subtended from the rotation axis in a plane generally perpendicular thereto, said tracked means being arranged, when not in use, to occupy a second space not overlapping with said first space, thereby not preventing the manual engagement of the rim members.

17. Apparatus according to claim 14, and wherein said tracked means comprises selectably deployable track means operative, in a deployed mode, to permit travel of the wheelchair along a surface not suitable for wheeled travel, said tracked means being arranged, when in a non-deployed mode, to occupy a space external to and lateral to the wheelchair, thereby not preventing steering thereof, and thereby also not obstructing mounting of the wheelchair nor dismounting therefrom by a person.

18. Apparatus according to claim 15, and wherein the wheelchair also includes rotational bearings for enabling rotation of the manually rotatable drive wheels about the rotation axle, and wherein said first and said mating portions include means for preventing relative rotation, about the rotation axle of said pair of track assemblies engaged therewith.

19. Apparatus according to claim 15, and wherein each said track assembly comprises:
housing means defining said second mating portion;
first and second track units mounted onto said housing means for selectable rotation about respective first and second rotation axes extending transversely therethrough;
means for driving said track units; and
means for selectably rotating said pair of track units so as to cause positioning thereof in extended and retracted positions, wherein said track units, when in said extended position, extend radially beyond said manually rotatable drive wheels thereby to engage the travel surface so as to support the wheelchair thereon, thereby permitting travel of the wheelchair along the travel surface via said track units in response to operation of said means for driving said track units.

20. Apparatus according to claim 19, and wherein said first track unit comprises:

a first support member mounted onto said housing means via said first rotation axis;

a first plurality of wheel members rotatably mounted onto said first support member; and a first continuous web element mounted, under a predetermined tension force, onto said first plurality of wheel members, so as to be drivably engageable thereby, and said second track unit comprises:

a second support member mounted onto said housing means via said second rotation axis;

a second plurality of wheel members rotatably mounted onto said second support member; and a second continuous web element mounted, under a predetermined tension force, onto said second plurality of wheel members, so as to be drivably engageable thereby.

21. Apparatus according to claim 20, and wherein said first plurality of wheel members includes a first track drive wheel arranged for rotation by said means for driving said track units and further arranged for frictional engagement with said first web element thereby to cause a driving motion thereof.

22. Apparatus according to claim 21, and wherein said second plurality of wheel members includes a second track drive wheel, and each said track assembly also includes means for transmitting a drive force from a predetermined one of said first plurality of wheel members to said second track drive wheel.

23. Apparatus according to claim 19, and wherein said means for selectably rotating said pair of track units comprises:

means for rotating a predetermined one of said first and second track units about the associated one of said first and second rotation axes; and means, associated with said first and second track units, for transmitting a rotational motion applied to said predetermined one of said first and second track units to the other of said first and second track units.

24. Apparatus according to claim 14, and also including:

gradient sensing means for sensing the gradient of a stepped travel surface; and means, associated with said gradient sensing means, for maintaining generally vertical alignment of the center of mass of said wheelchair apparatus and a person seated thereon with the geometric center of said tracked means.

25. Apparatus according to claim 14 and wherein said tracks comprise forward and rear track assemblies located laterally outward of each of the drive wheels, said forward and rear track assemblies being rotatable from an inoperative orientation to an operative orientation by rotation thereof about respective forward and rear track orientation axes which are parallel to but not coaxial with said rotation axle.

26. Wheelchair apparatus comprising:
a chassis;
seating means mounted onto said chassis; and
travel means associated with said chassis and comprising:
wheeled means including:
a pair of manually rotatable drive wheels mounted about a rotation axis extending through said chassis, said wheeled means being operative to support said chassis on a travel surface so as to enable wheeled travel of said chassis therealong;
tracked means associated with said wheeled means and operative to assist travel of said chassis along a travel surface not suitable for traverse by said wheeled means; and
means for decouplably mounting said tracked means onto said chassis, externally of said wheeled means, and
wherein said chassis defines a pair of first mating portions aligned along an axis extending transversely through said chassis, said tracked means comprises a pair of track assemblies each having a second mating portion configured for mating with one of said first mating portions, and said means for decouplably mounting comprises means for permitting mutual locking engagement of said first and second mating portions in response to a resultant force component of at least a predetermined magnitude acting in a first direction along said axis, and for permitting decoupling of said first and second mating portions in response to a resultant force component of at least a predetermined magnitude acting along said axis in a second direction opposite to said first direction,
and also including means for sensing the engagement of each said second mating portion with a corresponding first mating portion, and for further sensing the disengagement of second mating portion from said corresponding first mating portion. cm 27. Apparatus for assisting travel across a travel surface not suitable for traverse by a wheelchair having a chassis, a seat mounted onto the chassis, a pair of manually rotatable drive wheels mounted about a rotation axle extending through the chassis, said apparatus for assisting travel comprising:

tracked means associated with the manually rotatable drive wheels; and means for decouplably mounting said tracked means onto said chassis externally of the manually rotatable drive wheels, wherein the chassis defines a pair of first mating portions aligned along an axis extending transversely through the chassis, said tracked means comprises a pair of track assemblies each having a second mating portion configured for mating with one of said first mating portions, and said means for decouplably mounting comprises means for permitting mutual locking engagement of said first and second mating portions in response to a resultant force component of at least a predetermined magnitude acting in a first direction along said axis, and for permitting decoupling of said first and second mating portions in response to a resultant force component of at least a predetermined magnitude acting along said axis in a second direction opposite to said first direction, and also including means for sensing the engagement of each said second mating portion with a corresponding first mating portion, and for further sensing the disengagement of second mating portion from said corresponding first mating portion.

27. Apparatus for assisting travel across a travel surface not suitable for traverse by a wheelchair having a chassis, a seat mounted onto the chassis, a pair of manually rotatable drive wheels mounted about a rotation axle extending through the chassis, said apparatus for assisting travel comprising:

tracked means associated with the manually rotatable drive wheels; and means for decouplably mounting said tracked means onto said chassis externally of the manually rotatable drive wheels, wherein the chassis defines a pair of first mating portions aligned along an axis extending transversely through the chassis, said tracked means comprises a pair of track assemblies each having a second mating portion configured for mating with one of said first mating portions, and said means for decouplably mounting comprises means for permitting mutual locking engagement of said first and second mating portions in response to a resultant force component of at least a predetermined magnitude acting in a first direction along said axis, and for permitting decoupling of said first and second mating portions in response to a resultant force component of at least a predetermined magnitude acting along said axis in a second direction opposite to said first direction, and also including means for sensing the engagement of each said second mating portion with a corresponding first mating portion, and for further sensing the disengagement of second mating portion from said corresponding first mating portion.

* * * * *